US010840840B2

(12) United States Patent
Fujita et al.

(10) Patent No.: US 10,840,840 B2
(45) Date of Patent: Nov. 17, 2020

(54) MACHINE LEARNING CORRECTION PARAMETER ADJUSTMENT APPARATUS AND METHOD FOR USE WITH A MOTOR DRIVE CONTROL SYSTEM

(71) Applicant: Mitsubishi Electric Corporation, Tokyo (JP)

(72) Inventors: Tomoya Fujita, Tokyo (JP); Toshiaki Kimata, Tokyo (JP); Tatsuya Ito, Tokyo (JP); Yukihiro Iuchi, Tokyo (JP); Goh Sato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/336,472

(22) PCT Filed: Jun. 14, 2018

(86) PCT No.: PCT/JP2018/022775
§ 371 (c)(1),
(2) Date: Mar. 26, 2019

(87) PCT Pub. No.: WO2019/239553
PCT Pub. Date: Dec. 19, 2019

(65) Prior Publication Data
US 2019/0386595 A1 Dec. 19, 2019

(51) Int. Cl.
*H02P 21/00* (2016.01)
*G06F 17/16* (2006.01)
*G06N 20/00* (2019.01)

(52) U.S. Cl.
CPC .......... *H02P 21/0014* (2013.01); *G06F 17/16* (2013.01); *G06N 20/00* (2019.01); *H02P 21/0021* (2013.01)

(58) Field of Classification Search
CPC ..... G06F 17/16; G06N 20/00; H02P 21/0014; H02P 21/0021
See application file for complete search history.

(56) References Cited

U.S. PATENT DOCUMENTS

| 6,034,498 A | 3/2000 | Hamamura et al. |
| 7,205,743 B2 * | 4/2007 | Iwashita ............. G05B 19/404 318/432 |

(Continued)

FOREIGN PATENT DOCUMENTS

| CN | 106612088 A | 5/2017 |
| DE | 10 2016 012 171 A1 | 4/2017 |

(Continued)

OTHER PUBLICATIONS

International Search Report dated Sep. 18, 2018 PCT/JP2018/022775, filed on Jun. 14, 2018, 4 pages including translation of the Written Opinion.

(Continued)

*Primary Examiner* — Chun Cao
(74) *Attorney, Agent, or Firm* — XSensus LLP

(57) ABSTRACT

A machine learning apparatus for learning a correction parameter used in correction of a command value that controls a motor in a motor drive system including a plurality of kinds of correction functions includes: a state observation unit that observes, as a state variable, each of a feature calculated on the basis of drive data and the kind of any of the correction functions of the motor drive system and the correction parameter; and a learning unit that learns the correction parameter for each of the correction functions according to a training data set created on the basis of the state variable.

17 Claims, 12 Drawing Sheets

(56) References Cited

U.S. PATENT DOCUMENTS

| | | | |
|---|---|---|---|
| 9,990,590 B2* | 6/2018 | Kawai | G06N 3/0427 |
| 2016/0088218 A1 | 3/2016 | Kikuchi et al. | |
| 2017/0090430 A1 | 3/2017 | Nakazawa | |
| 2017/0111000 A1* | 4/2017 | Saito | H02P 29/60 |
| 2017/0123385 A1 | 5/2017 | Iijima | |
| 2017/0154283 A1 | 6/2017 | Kawai et al. | |
| 2017/0199510 A1 | 7/2017 | Fujita et al. | |
| 2018/0026573 A1* | 1/2018 | Akashi | H02P 29/10 |
| | | | 318/6 |
| 2018/0174658 A1* | 6/2018 | Kikuchi | G11C 29/028 |
| 2018/0281091 A1* | 10/2018 | Nakashima | B23H 1/024 |

FOREIGN PATENT DOCUMENTS

| | | |
|---|---|---|
| JP | 11-024754 A | 1/1999 |
| JP | 2005-78477 A | 3/2005 |
| JP | 2009-244933 A | 10/2009 |
| JP | 2015-011089 A | 1/2015 |
| JP | 2017-064837 A | 4/2017 |
| JP | 2017-68563 A | 4/2017 |
| JP | 2017-084104 A | 5/2017 |
| JP | 2017-102613 A | 6/2017 |
| JP | 2017-102624 A | 6/2017 |
| JP | 2019-185539 A | 10/2019 |
| WO | 2016-203614 A1 | 12/2016 |

OTHER PUBLICATIONS

Office Action dated Apr. 22, 2020 in German Patent Application No. 11 2018 000 122.9, 18 pages.

F.L. Lewis, et al., "Neural Networks in Feedback Control Systems" Mechanical Engineers' Handbook, Third Edition, Instrumentation, Systems, Controls, and MEMS, Hoboken, N. J., Wiley, 2006, 36 pages.

Written Opposition dated Mach 24, 2020 in Japanese Patent No. 6567205 (Application No. 2018-564994), with Partial English Translation, 83 pages.

Akio Noda, et al., "Applicability Study of the Active Search Algorithm Based on Machine Learning Scheme in the Case of Servo Tuning Problems," the Society of Instrument and Control Engineers, ISSN 0453-4654, vol. 53, No. 3, Mar. 31, 2017, with English Abstract, 13 pages.

Mitsubishi Electric, "Instruction Manual for Mitsubishi CNC MDS-D2/DH2 Series, (Chapter 5 Servo Adjustment)" Jun. 2014, 171 pages.

Office Action dated Jul. 20, 2020, issued in corresponding Chinese Patent Application No. 201880004299.4, 5 pages, with English translation.

* cited by examiner

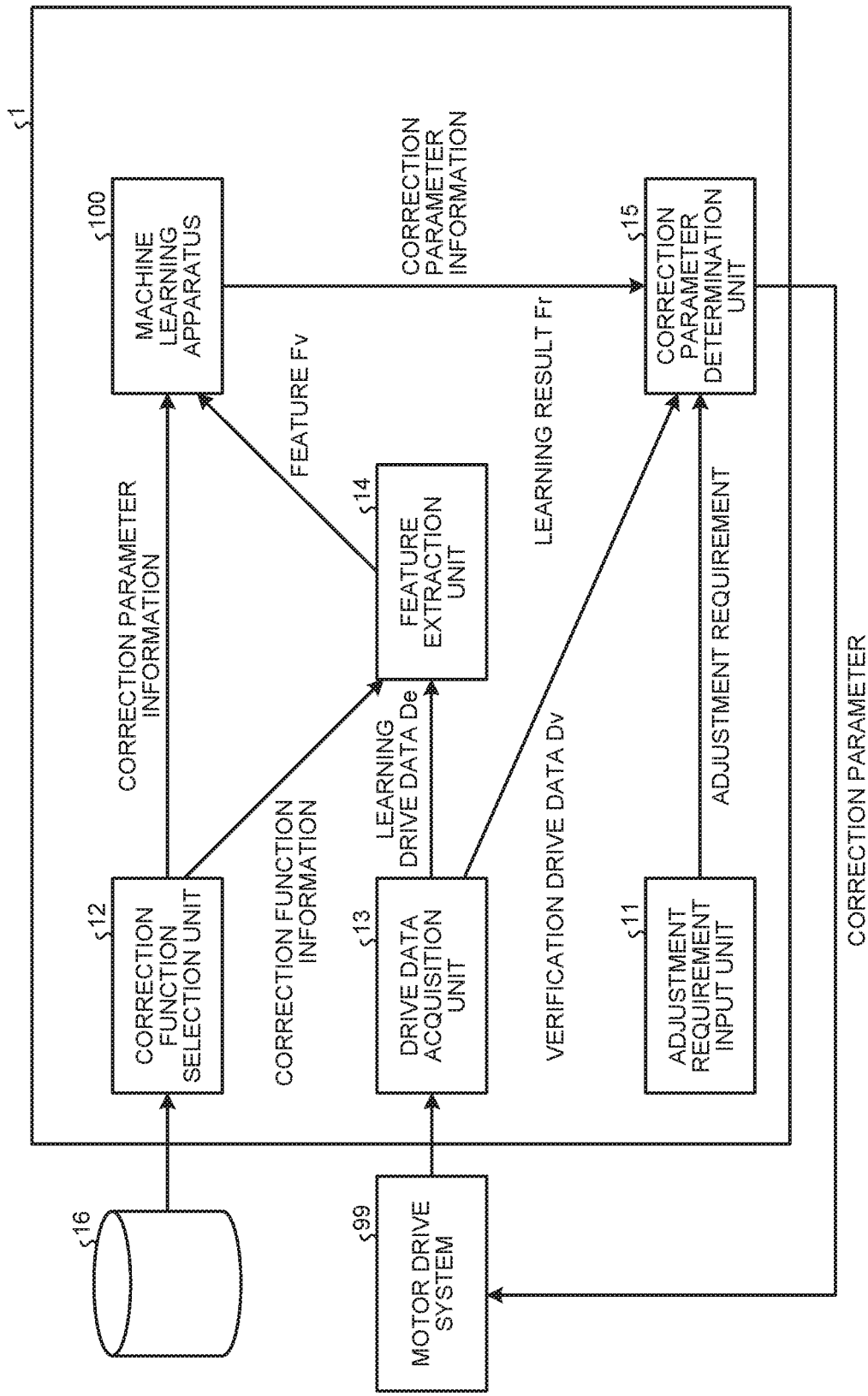

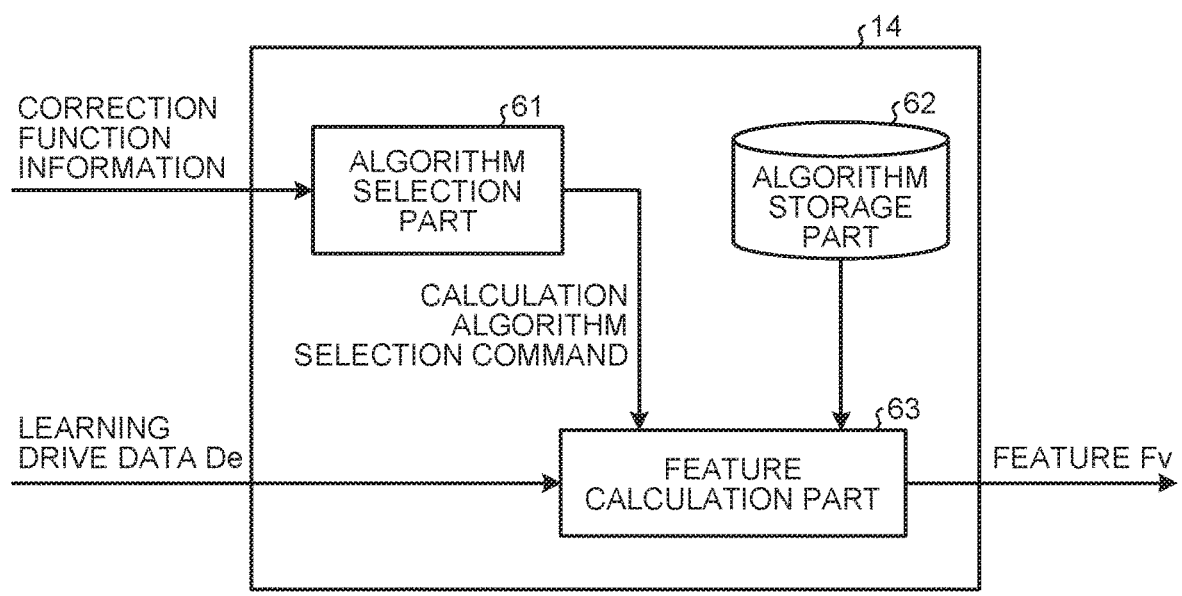
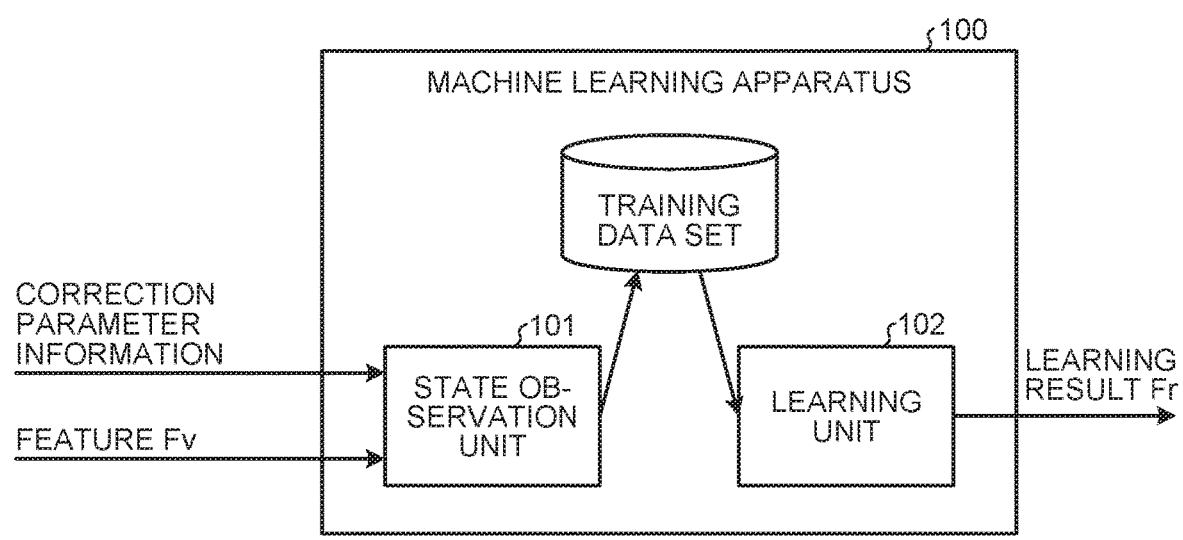

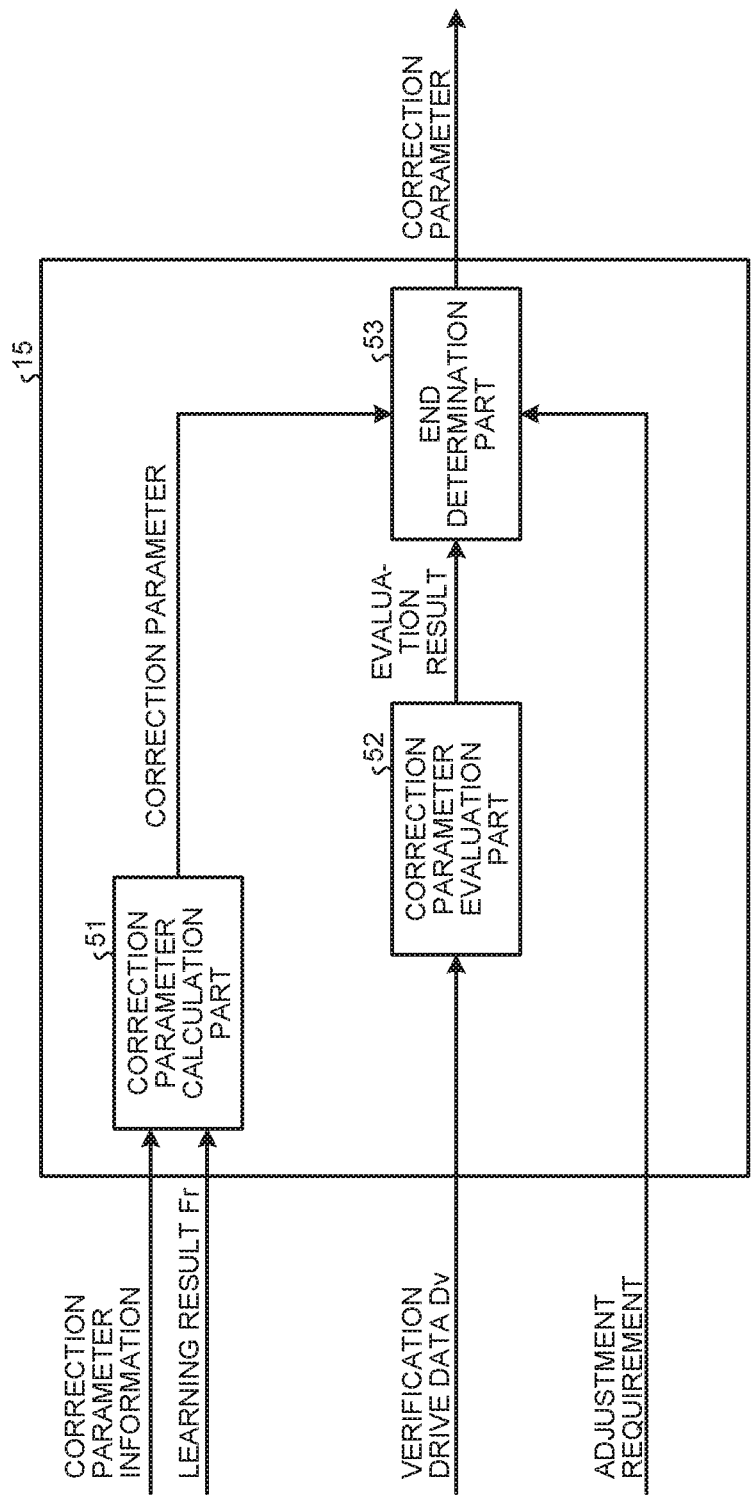

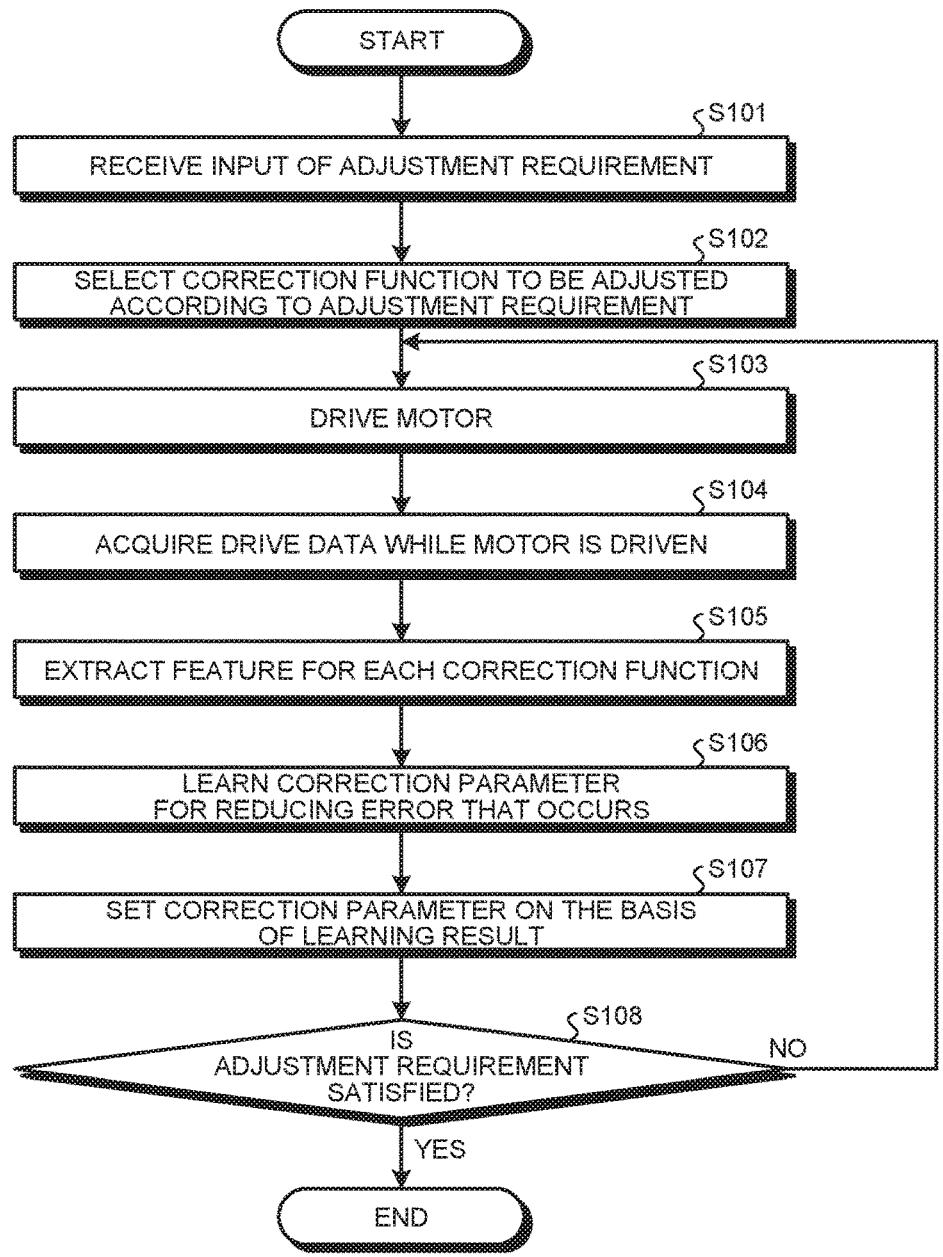
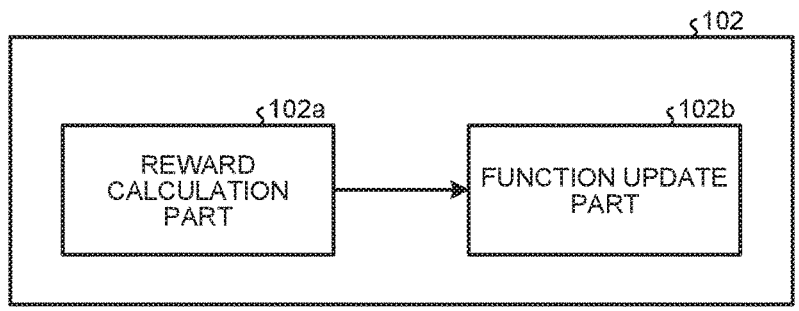

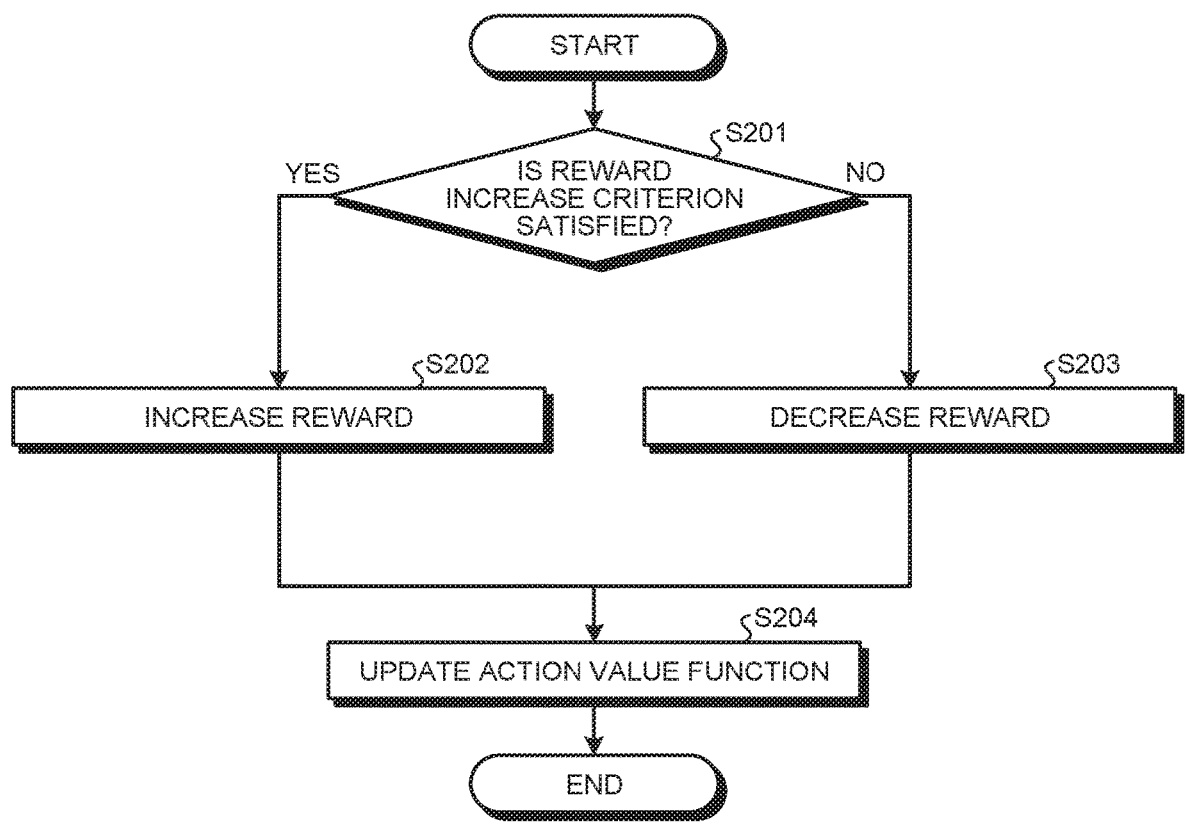

MACHINE LEARNING CORRECTION PARAMETER ADJUSTMENT APPARATUS AND METHOD FOR USE WITH A MOTOR DRIVE CONTROL SYSTEM

CROSS-REFERENCE TO RELATED APPLICATIONS

The present application is based on PCT filing PCT/JP2018/022775, filed Jun. 14, 2018, which is incorporated herein by reference.

FIELD

The present invention relates to a machine learning apparatus that learns a correction parameter used in a correction function of a motor drive system equipped with a plurality of kinds of correction functions, a correction parameter adjustment apparatus, and a machine learning method.

BACKGROUND

A motor drive system driven by a motor is, for example, a machine tool, an industrial machine, a robot, or a conveyor. The motor drive system is controlled such that a controlled object such as a tool, a workpiece, or a hand follows a given command value. However, various error factors and disturbance factors are inherent in a mechanical structure and a mechanical element forming the motor drive system, so that the accuracy of following the command value is reduced in some cases. The error factors include friction on a sliding surface, insufficient rigidity of a structural member, an assembly error, a control delay, heating of a motor, and the like. For this reason, the command value can be used after being corrected in consideration of the errors. Correction conditions such as a correction amount and a correction timing of the command value have different optimum values depending on differences in the structure of the motor drive systems, individual differences among the systems, differences in the environment where the systems are installed, and the like.

An operator spends time and effort to adjust the correction conditions for each motor drive system, and also requires a period of familiarization until he can perform proper adjustment of the correction conditions. For this reason, a system that automatically adjusts the correction conditions is under study. Patent Literature 1 discloses a technique that automatically determines a correction condition by using a correction parameter for determining a correction condition of a motion error caused by the influence of friction. The technique automatically determines a correction parameter related to friction correction by changing the correction parameter for determining the correction condition of the motion error caused by the influence of friction, and repeatedly correcting a torque command and updating a corrected torque until a response error occurring during a circular motion becomes smaller than or equal to a threshold.

CITATION LIST

Patent Literature

Patent Literature 1: Japanese Patent Application Laid-open No. H11-24754

SUMMARY

Technical Problem

However, the technique described in Patent Literature 1 above only has an algorithm for adjusting only a correction parameter of a single correction function, and can thus adjust only the correction parameter of the single correction function. Creation of an algorithm for adjusting a correction parameter of a correction function takes a lot of time and effort, and when a motor drive system has a plurality of kinds of correction functions, an algorithm for adjusting a correction parameter needs to be created individually for each correction function, which results in enormous time and effort required in creating the algorithms.

The present invention has been made in view of the above, and an object of the present invention is to provide a machine learning apparatus and a correction parameter adjustment apparatus, the machine learning apparatus being able to easily adjust a correction parameter for determining a correction condition of a command value given to a motor drive system even when the motor drive system has a plurality of kinds of correction functions.

Solution to Problem

In order to solve the aforementioned problems and achieve the object, the present invention provides a machine learning apparatus for learning a correction parameter used in correction of a command value that controls a motor in a motor drive system including a plurality of kinds of correction functions, the apparatus including: a state observation unit to observe, as a state variable, each of a feature calculated on the basis of drive data and the kind of any of the correction functions of the motor drive system and the correction parameter; and a learning unit to learn the correction parameter for each of the correction functions according to a training data set created on the basis of the state variable.

Advantageous Effects of Invention

The machine learning apparatus according to the present invention can easily adjust the correction parameter for determining the correction condition of the command value given to the motor drive system even when the motor drive system has the plurality of kinds of correction functions.

BRIEF DESCRIPTION OF DRAWINGS

FIG. 1 is a diagram illustrating a functional configuration of a correction parameter adjustment apparatus according to a first embodiment of the present invention.

FIG. 2 is a diagram illustrating a configuration of a feature extraction unit illustrated in FIG. 1.

FIG. 3 is a diagram illustrating a configuration of a machine learning apparatus illustrated in FIG. 1.

FIG. 4 is a diagram illustrating a configuration of a correction parameter determination unit illustrated in FIG. 1.

FIG. 9 is a flowchart illustrating an operation of the correction parameter adjustment apparatus illustrated in FIG. 1.

FIG. 10 is a diagram illustrating a configuration of a learning unit illustrated in FIG. 3 in a case where the machine learning apparatus uses reinforcement learning.

FIG. 11 is a flowchart illustrating an operation of the learning unit in the case where the machine learning apparatus illustrated in FIG. 3 uses reinforcement learning.

DESCRIPTION OF EMBODIMENTS

Figure 5:
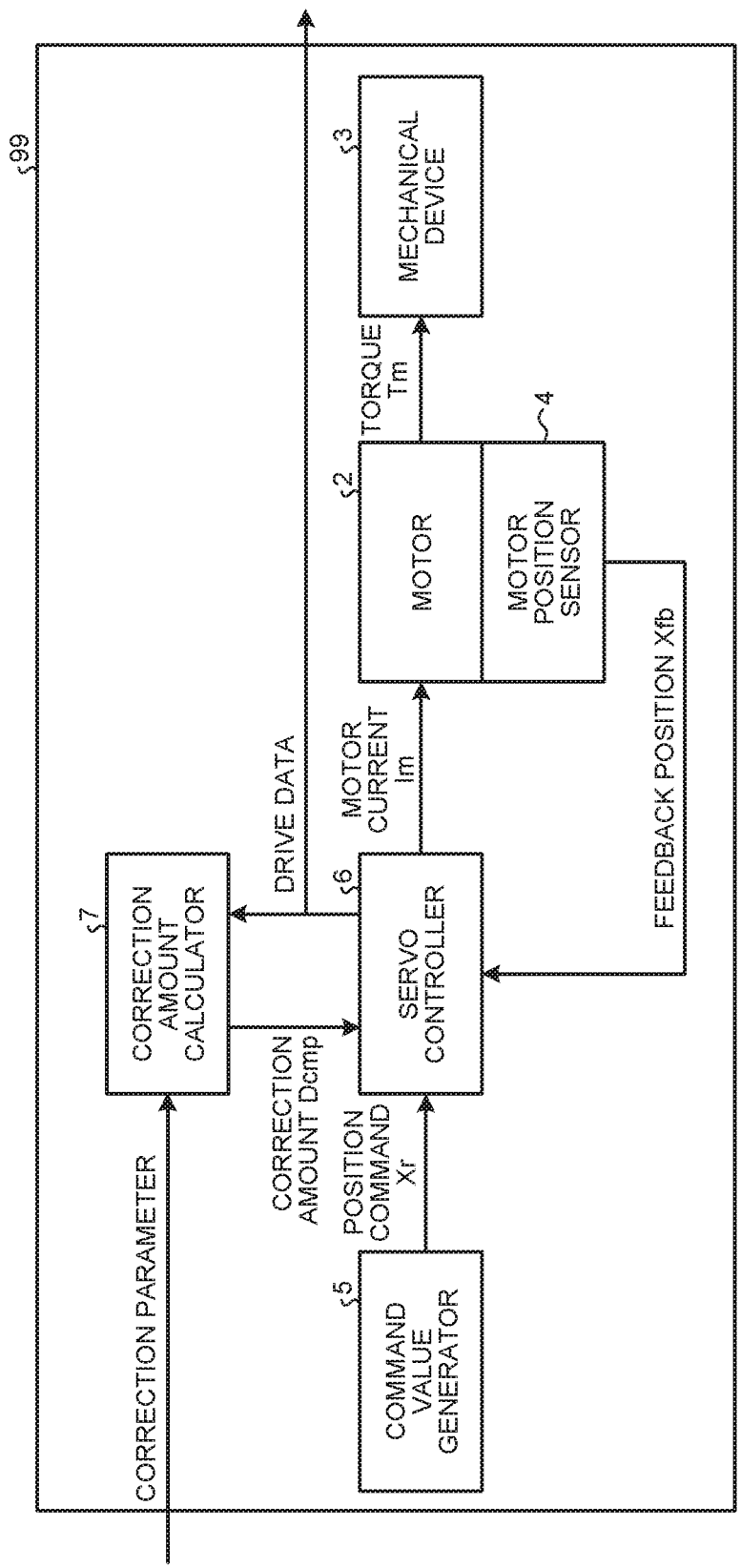
FIG. 5 is a diagram illustrating a configuration of a motor drive system illustrated in FIG. 1.

A machine learning apparatus, a correction parameter adjustment apparatus, and a machine learning method according to embodiments of the present invention will now be described in detail with reference to the drawings. Note that the present invention is not limited to the embodiments.

First Embodiment

FIG. 1 is a diagram illustrating a functional configuration of a correction parameter adjustment apparatus 1 according to a first embodiment of the present invention. The correction parameter adjustment apparatus 1 uses machine learning and adjusts a correction parameter for determining a correction condition of a command value given to a motor drive system 99. The correction parameter adjustment apparatus 1 includes an adjustment requirement input unit 11, a correction function selection unit 12, a drive data acquisition unit 13, a feature extraction unit 14, a correction parameter determination unit 15, and a machine learning apparatus 100.

The adjustment requirement input unit 11 receives an input of an adjustment requirement for determining whether or not to end adjustment of a correction parameter. The adjustment requirement includes desired accuracy, desired cycle time, a maximum tolerance, adjustment time, and the like. The adjustment requirement input unit 11 can receive a combination of a plurality of adjustment requirements. The adjustment requirement input unit 11 inputs the received adjustment requirement to the correction parameter determination unit 15.

The correction function selection unit 12 selects a correction function used in the adjustment by acquiring a kind of a correction function included in the motor drive system 99 and correction parameter information indicating a correction parameter used in execution of a correction function from a correction function information storage 16 that stores the kind of a correction function included in the motor drive system 99, information indicating the content of a correction function, and the correction parameter information. The correction function is a unit of operation for achieving a desired effect and includes a function of correcting a motion error caused by the influence of friction, a vibration suppression function, an inter-axis interference correction function, and the like. The information indicating the content of a correction function includes an error factor subjected to correction, a state quantity necessary for calculating a correction amount, a controlled variable to which the correction amount is applied, an arithmetic expression for the correction amount, the number of correction parameters necessary for calculating the correction amount, and the like. The correction parameter information includes a state quantity on which a correction parameter depends.

The correction function selection unit 12 may select in turn a predetermined combination of correction functions, or may receive an input of selection of a correction function from an operator. The correction function selection unit 12 inputs the correction parameter information on the selected correction function to the machine learning apparatus 100, and inputs correction function information to the feature extraction unit 14. The correction function information includes information for identifying the selected correction function and information indicating the content of the correction function.

The drive data acquisition unit 13 acquires learning drive data De and verification drive data Dv from the motor drive system 99. The learning drive data De and the verification drive data Dv are information related to the drive of the motor drive system 99, and include at least one of: command information to a motor driving the motor drive system 99 such as a position command, a speed command, and a current command for the motor; feedback data from the motor driving the motor drive system 99 such as position feedback, speed feedback, and current feedback; motor state information such as ideal motor position, motor speed, and motor current in the absence of an error; and drive data of a mechanical device to be controlled by the motor. The learning drive data De and the verification drive data Dv may also include a difference between the ideal motor position and an actual motor position, and a difference between the ideal motor speed and an actual motor speed. The learning drive data De and the verification drive data Dv may be of the same or different kinds. The drive data acquisition unit 13 inputs the acquired learning drive data De to the feature extraction unit 14 and inputs the acquired verification drive data Dv to the correction parameter determination unit 15.

On the basis of the correction function information input from the correction function selection unit 12, the feature extraction unit 14 extracts a feature Fv for each correction function from the learning drive data De input from the drive data acquisition unit 13. The feature extraction unit 14 extracts the feature Fv equal in number to the number of correction functions selected as the object of adjustment. One feature Fv is a piece of data indicating a characteristic of drive data for each correction function and is a multi-dimensional vector quantity, not a one-dimensional scalar quantity. The feature extraction unit 14 inputs the extracted feature Fv to the machine learning apparatus 100.

FIG. 2 is a diagram illustrating a configuration of the feature extraction unit 14 illustrated in FIG. 1. The feature extraction unit 14 includes an algorithm selection part 61, an algorithm storage part 62, and a feature calculation part 63. The algorithm selection part 61 acquires information indicating a correction function to be adjusted from the correction function information, and selects an algorithm used for extracting a feature from the learning drive data De for each correction function. The algorithm selection part 61 inputs a calculation algorithm selection command, which indicates the algorithm selected for each correction function, to the feature calculation part 63. The algorithm storage part 62 stores a function group indicating a calculation algorithm for executing various filters such as a low-pass filter, a high-pass filter, a band-pass filter, and a band-elimination filter, motion feature waveform extraction such as motion direction reverse position detection, near zero velocity detection, and corner detection, data cutting processing, and the like. The data cutting is to cut data and extract the portion being cut. On the basis of the calculation algorithm selection command input from the algorithm selection part 61, the feature calculation part 63 extracts a calculation algorithm to be used from the algorithm storage part 62 and uses the extracted calculation algorithm to calculate the feature for each correction function from the learning drive data De.

As for the friction correction function, the algorithm selection part 61 selects the motion direction reverse position detection and cutting of data near reversing of the motion direction. When the learning drive data De includes data on the position command, position feedback, motor current, and actual position with respect to the ideal position, the feature calculation part 63 calculates the feature by applying the calculation algorithm selected for each piece of data. As for the vibration correction function, the algorithm selection part 61 selects cutting of data immediately after stopping of the motion and the band-pass filter.

The description refers back to FIG. 1. The machine learning apparatus 100 learns a correction parameter for each feature Fv on the basis of the correction function information and the correction parameter information input from the correction function selection unit 12 and the feature Fv input from the feature extraction unit 14. The machine learning apparatus 100 learns the correction parameter that enables setting of a correction condition which reduces an error included in the drive data of the motor drive system 99. The machine learning apparatus 100 inputs a learning result Fr and the correction parameter information to the correction parameter determination unit 15.

FIG. 3 is a diagram illustrating a configuration of the machine learning apparatus 100 illustrated in FIG. 1. The machine learning apparatus 100 includes a state observation unit 101 and a learning unit 102. Using the correction parameter information and the feature, the state observation unit 101 observes the correction parameter and the feature extracted on the basis of the correction function as state variables. The state observation unit 101 creates and outputs a training data set for each correction function on the basis of the state variables. The learning unit 102 learns the correction parameter for each feature, that is, for each correction function, using the training data set created on the basis of the state variables by the state observation unit 101, and outputs the learning result Fr. A learning algorithm used by the learning unit 102 is supervised learning, unsupervised learning, reinforcement learning, or the like such as in a neural network.

The description refers back to FIG. 1. The correction parameter determination unit 15 determines the correction parameter on the basis of the learning result Fr and the correction parameter information input from the machine learning apparatus 100 to set the determined correction parameter in the motor drive system 99, and determines whether or not to end correction parameter adjustment processing on the basis of the adjustment requirement input from the adjustment requirement input unit 11 and the verification drive data Dv input from the drive data acquisition unit 13.

FIG. 4 is a diagram illustrating a configuration of the correction parameter determination unit 15 illustrated in FIG. 1. The correction parameter determination unit 15 includes a correction parameter calculation part 51, a correction parameter evaluation part 52, and an end determination part 53. On the basis of the learning result Fr and the correction parameter information input from the machine learning apparatus 100, the correction parameter calculation part 51 calculates a correction parameter for each correction function using the learning result Fr. The correction parameter evaluation part 52 evaluates the validity of the correction parameter that is currently set on the basis of the verification drive data Dv. On the basis of a result of the evaluation by the correction parameter evaluation part 52 and the adjustment requirement input from the adjustment requirement input unit 11, the end determination part 53 determines whether or not to end the adjustment processing and sets the correction parameter calculated by the correction parameter calculation part 51 to the motor drive system 99.

Here, an example of the configuration of the motor drive system 99 will be described. FIG. 5 is a diagram illustrating the configuration of the motor drive system 99 illustrated in FIG. 1. The motor drive system 99 includes a motor 2, a mechanical device 3, a motor position sensor 4, a command value generator 5, a servo controller 6, and a correction amount calculator 7. Although only one motor 2 is illustrated, the motor drive system 99 may include one or two or more of the motors 2.

The motor 2 is an actuator, specifically, a rotary motor. The motor 2 is connected to the mechanical device 3 and the motor position sensor 4 for detecting the position of the motor 2. The motor 2 rotates according to motor current Im supplied and drives the mechanical device 3 with rotational torque Tm.

Figure 6:
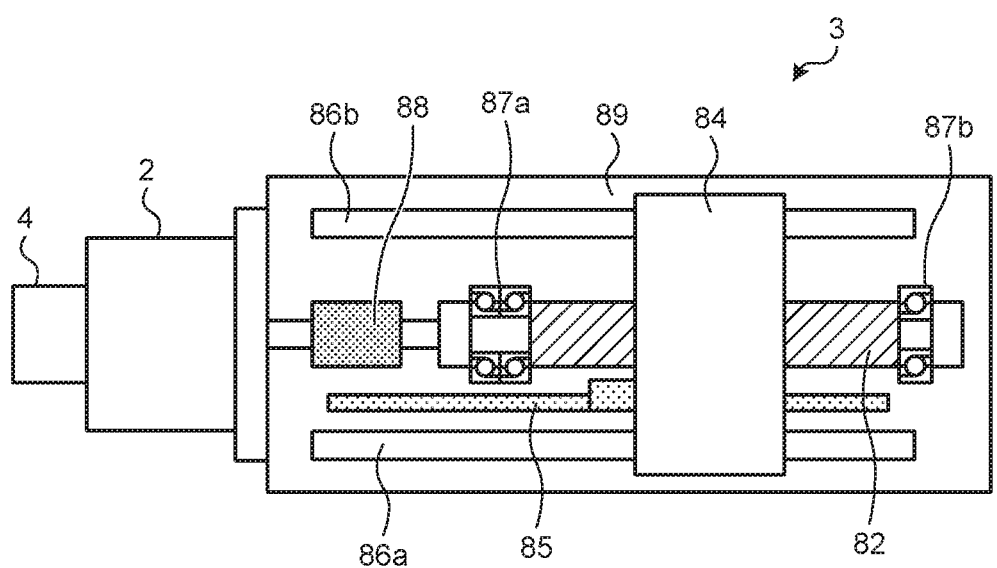
FIG. 6 is a diagram illustrating a configuration of a mechanical device illustrated in FIG. 5.

FIG. 6 is a diagram illustrating a configuration of the mechanical device 3 illustrated in FIG. 5. The mechanical device 3 includes a bed 89 disposed horizontally, guide mechanisms 86a and 86b fixed to the bed 89, and a table 84 supported by the guide mechanisms 86a and 86b and movable in a limited direction. The mechanical device 3 further includes a ball screw 82 to which a movable part including a nut (not illustrated) provided on one surface of the table 84 and the table 84 is mounted, a ball front bearing 87a for holding the ball screw 82, and a rear bearing 87b. The ball screw 82 is connected to a rotary shaft of the motor 2 via a rigid coupling 88. Here, as a bearing system, a single anchor system is used in which the ball front bearing 87a is fixed by an angular contact ball bearing and the rear bearing 87b is supported by a deep groove ball bearing.

The table 84 is supported by the guide mechanisms 86a and 86b so that the movement thereof is restricted except in the movable direction. Here, the guide mechanisms 86a and 86b are assumed to be linear motion rolling guide mechanisms in which a rigid ball is used as a rolling element and lubricated with grease. The mechanical device 3 further includes a table position sensor 85 for detecting the position of the table 84. A specific example of the table position sensor 85 is a linear encoder. The table position sensor 85 can input a detected position of the table as a feedback position Xfb to the servo controller 6.

The configuration of the mechanical device 3 described above is an example and not limited thereto. As will be described later, the correction parameter adjustment apparatus 1 of the present embodiment can control a plurality of the mechanical devices 3.

The description refers back to FIG. 5. The motor position sensor 4 is attached to the motor 2 and detects the rotational position of the motor 2. A specific example of the motor position sensor 4 is a rotary encoder. The motor position sensor 4 can input a detected position of the motor 2 as a feedback position Xfb to the servo controller 6. The feedback position Xfb is at least one of the table position detected by the table position sensor 85 and the position of the motor 2 detected by the motor position sensor 4.

Note that the table position sensor 85 can measure the distance of movement of the table 84, whereas the position directly detected by the motor position sensor 4 is the rotation angle of the motor 2. However, the servo controller 6 can convert the rotation angle of the motor 2 into the length in the direction of movement of the table 84 by multiplying the detected rotation angle by a ball screw lead, which is the distance of movement of the table per rotation of the motor 2, and dividing the product by $2n$ (rad) which is the angle of one rotation of the motor. Therefore, the motor position sensor 4 or the table position sensor 85 can be omitted. FIG. 5 illustrates an example in which the motor drive system 99 includes the motor position sensor 4, which inputs the motor position to the servo controller 6 as the feedback position Xfb. On the other hand, FIG. 6 illustrates an example in which the mechanical device 3 includes the table position sensor 85.

Feedback control using a result detected by the motor position sensor 4 as the feedback position Xfb is called semi-closed loop control. Feedback control using both the result detected by the motor position sensor 4 and a result detected by the table position sensor 85 or only the result detected by the table position sensor 85 as the feedback position Xfb is called fully-closed loop control.

The command value generator 5 generates a position command Xr of the motor 2 on the basis of an operation program Xc and inputs the generated position command Xr to the servo controller 6. Here, the operation program Xc is a numerical control (NC) program for numerical control in which a command position and a command speed for a controlled object of the mechanical device 3 are described using G codes. The position command Xr input to the servo controller 6 is a time series position command generated by performing acceleration/deceleration processing and filtering processing on the operation program Xc. Here, the G code is one of instruction codes used in numerical control, and is a command code described when performing positioning, linear interpolation, circular interpolation, plane designation, or the like of a controlled object.

The servo controller 6 generates a motor current Im for driving the motor 2 by performing feedback control on the basis of the position command Xr input from the command value generator 5, the feedback position Xfb as information indicating the position of a controlled object, and a correction amount Dcmp input from the correction amount calculator 7, and inputs the generated motor current Im to the motor 2.

The correction amount calculator 7 outputs the correction amount Dcmp to the servo controller 6 for each correction function on the basis of drive data Dc and a correction parameter Pc, the correction amount including three state quantities being a position correction amount, a speed correction amount, and a current correction amount. The correction parameter Pc and the drive data Dc are each a vector or matrix composed of a plurality of state quantities. In the case of the friction correction function, for example, the correction amount calculator 7 calculates the current correction amount using a displacement from the motion direction reverse position, a state quantity of the speed, a position correction parameter, and a speed correction parameter.

Figure 7:
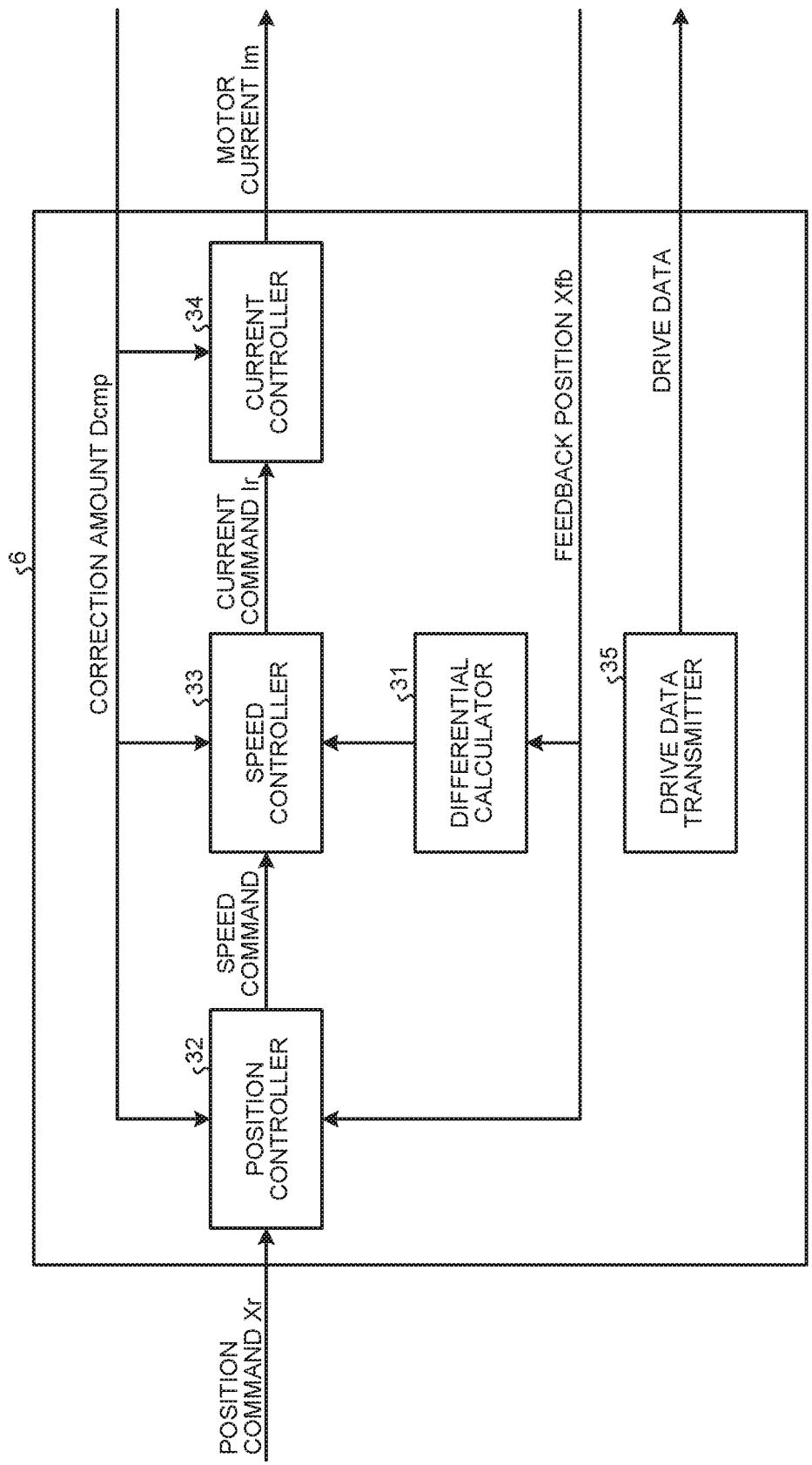
FIG. 7 is a diagram illustrating a configuration of a servo controller illustrated in FIG. 5.

FIG. 7 is a diagram illustrating a configuration of the servo controller 6 illustrated in FIG. 5. The servo controller 6 includes a differential calculator 31, a position controller 32, a speed controller 33, a current controller 34, and a drive data transmitter 35.

The differential calculator 31 calculates a feedback speed by differentiating the feedback position Xfb. The differential calculator 31 inputs the calculated feedback speed to the speed controller 33.

The position controller 32 generates a speed command on the basis of the feedback position Xfb input from the motor position sensor 4, the position command Xr input from the command value generator 5, and the position correction amount included in the correction amount Dcmp input from the correction amount calculator 7. Specifically, the position controller 32 executes position control processing such as proportional control to reduce a position deviation, which is a difference between the position command and the feedback position Xfb, and generates the speed command by performing correction processing on the basis of the position correction amount. The position controller 32 inputs the generated speed command to the speed controller 33.

The speed controller 33 generates a current command Ir on the basis of the feedback speed input from the differential calculator 31, the speed command input from the position controller 32, and the speed correction amount included in the correction amount Dcmp input from the correction amount calculator 7. Specifically, the speed controller 33 executes speed control processing such as proportional-integral control to reduce a speed deviation, and generates the current command Ir by performing correction processing on the basis of the speed correction amount. The speed controller 33 inputs the generated current command Ir to the current controller 34.

The current controller 34 generates the motor current Im on the basis of the current command Ir input from the speed controller 33 and the current correction amount included in the correction amount Dcmp input from the correction amount calculator 7. Specifically, the current controller 34 performs current control such as proportional-integral control such that the motor current Im to be output matches the input current command Ir. The current controller 34 inputs the generated motor current Im to the motor 2.

The drive data transmitter 35 collects command values, feedback values, correction amounts, and the like in the servo controller 6 and outputs them as drive data. The drive data output by the drive data transmitter 35 is input to the correction amount calculator 7 and the drive data acquisition unit 13 of the correction parameter adjustment apparatus 1.

Note that although the example of performing the semi-closed loop control is described with reference to FIG. 7, in a case of the fully-closed loop control, the value detected by the motor position sensor 4 is input to the differential calculator 31 while the value detected by the table position sensor 85 is input to the position controller 32 with both of the values being used as the feedback position Xfb.

Figure 8:
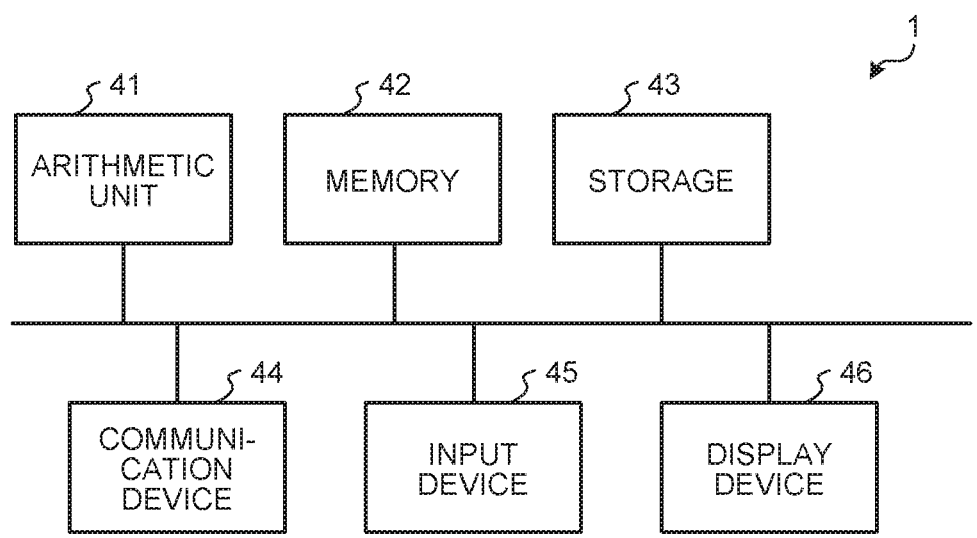
FIG. 8 is a diagram illustrating an example of a hardware configuration of the correction parameter adjustment apparatus illustrated in FIG. 1.

Next, a hardware configuration of the present embodiment will be described. FIG. 8 is a diagram illustrating an example of the hardware configuration of the correction parameter adjustment apparatus 1 illustrated in FIG. 1. The correction parameter adjustment apparatus 1 includes an arithmetic unit 41, a memory 42, a storage 43, a communication device 44, an input device 45, and a display device 46.

The arithmetic unit 41 is a processor including a central processing unit (CPU) that performs arithmetic processing. The memory 42 functions as a work area for storing data used by the arithmetic unit 41 during the arithmetic processing. The storage 43 stores a computer program, information, and the like. The communication device 44 has a function of communicating with the outside of the correction parameter adjustment apparatus 1. The input device 45 receives an input from an operator. The input device 45 is a keyboard, a mouse, or the like. The display device 46 outputs a display screen. The display device 46 is a monitor, a display, or the like. Note that a touch panel integrating the input device 45 and the display device 46 may be used.

The functions of the adjustment requirement input unit 11, the correction function selection unit 12, the drive data acquisition unit 13, the feature extraction unit 14, the correction parameter determination unit 15, and the machine learning apparatus 100 illustrated in FIG. 1 are implemented when the arithmetic unit 41 reads and executes the computer program stored in the storage 43. The input device 45 and the display device 46 are used when the adjustment requirement input unit 11 and the correction function selection unit 12 are implemented by the arithmetic unit 41. The communication device 44 may be used when the correction function selection unit 12 and the correction parameter determination unit 15 are implemented by the arithmetic unit 41.

The correction function information storage 16 is provided outside the correction parameter adjustment apparatus 1 in FIG. 1. In this case, the correction function information storage 16 is implemented by a server connected to the correction parameter adjustment apparatus 1 via a network, a server on the cloud, or the like. Alternatively, the correction function information storage 16 may be provided inside the correction parameter adjustment apparatus 1. In this case, the correction function information storage 16 is implemented by the storage 43. All or some of the functions of the correction parameter adjustment apparatus 1 and the machine learning apparatus 100 may be provided in isolation. In that case, the machine learning apparatus 100 is connected to the motor drive system 99 via a network.

FIG. 9 is a flowchart illustrating an operation of the correction parameter adjustment apparatus 1 illustrated in FIG. 1. First, the adjustment requirement input unit 11 receives an input of an adjustment requirement performed by an operator using the input device 45 (step S101). The adjustment requirement is the desired accuracy or desired cycle time, for example. The correction function selection unit 12 selects a correction function to be adjusted according to the adjustment requirement received by the adjustment requirement input unit 11 (step S102).

Next, the correction parameter determination unit 15 causes the motor drive system 99 to drive the motor 2 using a set correction parameter (step S103). Here, when the operation of step S103 is performed for the first time, the set correction parameter is a predetermined default value such as zero, a value of the correction parameter determined in the last adjustment processing, or the like. In the second and subsequent rounds of operation, a correction parameter set in step S107 described later is used. The drive data acquisition unit 13 acquires drive data while the motor 2 is driven from the motor drive system 99 (step S104). The feature extraction unit 14 extracts a feature for each correction function (step S105).

The machine learning apparatus 100 learns a correction parameter capable of reducing an error that occurs (step S106). The correction parameter determination unit 15 determines a correction parameter on the basis of a learning result Fr of the machine learning apparatus 100, and sets the determined correction parameter in the motor drive system 99 (step S107). The correction parameter determination unit 15 evaluates the correction parameter using the verification drive data Dv and determines whether or not the parameter satisfies the adjustment requirement (step S108). If the adjustment requirement is satisfied (Yes in step S108), the correction parameter adjustment apparatus 1 ends the correction parameter adjustment processing. If the adjustment requirement is not satisfied (No in step S108), the correction parameter adjustment apparatus 1 repeats the correction parameter adjustment processing from step S103.

Here, the configuration when the machine learning apparatus 100 uses reinforcement learning will be described. Reinforcement learning is a learning method in which an agent acting in a certain environment observes a current state and determines an action to take. The agent receives a reward from the environment by choosing an action and learns a policy to receive most rewards through a series of actions. Typical known techniques of reinforcement learning are Q learning, TD learning, and the like. In the case of Q learning, an action value table which is a general update expression of an action value function Q (s, a) is expressed by the following expression (1).

[Expression 1]

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

In expression (1), "$s_t$" represents a state at time "t", and "$a_t$" represents an action at time "t". The state transitions to "$s_{t+i}$" by the action "$a_t$". A reward earned by the transition of the state is represented as "$r_{t+1}$". A discount factor is represented as "$\gamma$". A learning rate is represented as "$\alpha$". When Q learning is applied, the state "$s_t$" corresponds to the state variable, and the action "$a_t$" corresponds to the correction parameter.

The update expression of expression (1) increases the action value function Q if the action value of the best action "a" at time "t+1" is higher than the action value function Q of the action "a" performed at time "t", or decreases the action value function Q in the opposite case. In other words, the action value function Q (s, a) is updated such that the action value function Q of the action "a" at time "t" approaches the best action value at time "t+1". As a result, the best action value in a certain environment sequentially propagates to action values in previous environments.

FIG. 10 is a diagram illustrating a configuration of the learning unit 102 illustrated in FIG. 3 in a case where the machine learning apparatus 100 uses reinforcement learning. The learning unit 102 includes a reward calculation part 102a and a function update part 102b.

The reward calculation part 102a calculates a reward on the basis of the state variable observed by the state observation unit 101. The reward calculation part 102a calculates a reward for each correction function. For each correction function, the reward calculation part 102a uses a feature indicating an error subjected to the correction function and increases a reward "r" when a reward increase criterion is satisfied, thereby giving a reward of "1", for example. When a reward decrease criterion is satisfied, the reward calculation part 102a decreases the reward "r" and gives a reward of "−1", for example. The reward increase criterion is that the error is smaller than a threshold, for example, while the reward decrease criterion is that the error is larger than a threshold, for example. The error is a position error, for example, which can be calculated by a difference between a position command or an ideal motor position in the absence of an error and the position feedback. Alternatively, the error may be a speed or current error.

The function update part 102b updates a function for determining a correction parameter according to the reward calculated by the reward calculation part 102a. In the case of Q learning, the action value function Q ($s_t$, $a_t$) expressed by expression (1) is used as a function for changing a correction parameter.

FIG. 11 is a flowchart illustrating the operation of the learning unit 102 in the case where the machine learning apparatus 100 illustrated in FIG. 3 uses reinforcement learning. Note that the operation illustrated in FIG. 11 corresponds to step S105 illustrated in FIG. 9.

The reward calculation part 102a determines whether or not the reward increase criterion is satisfied on the basis of a feature (step S201). If the reward increase criterion is satisfied (Yes in step S201), the reward calculation part 102a increases the reward (step S202). If the reward increase criterion is not satisfied (No in step S201), the reward calculation part 102a decreases the reward (step S203).

After the reward calculation part 102a calculates the reward, the function update part 102b updates the action value function on the basis of the calculated reward (step S204). The operations in step S201 to step S204 are repeatedly executed until the adjustment requirement is satisfied in step S107 of FIG. 9. When the action value function is updated by the operations in step S201 to step S204, a correction parameter is set on the basis of the action value function at that time in step S106 of FIG. 9. When the adjustment requirement is satisfied, the correction parameter set on the basis of the action value function at that time is used thereafter.

Although the above example performs machine learning using reinforcement learning, machine learning may be performed according to another known method such as the neural network, genetic programming, functional logic programming, or support vector machine.

As described above, the correction parameter adjustment apparatus 1 according to the first embodiment of the present invention extracts, as a feature, the drive data reflecting a phenomenon to be corrected for each of a plurality of correction functions, and learns a correction parameter for each feature. Such a configuration that learns the correction parameter for each feature, that is, each correction function, enables easy adjustment of the correction parameter for determining a correction condition of a command value given to the motor drive system even when the motor drive system has a plurality of kinds of correction functions. Moreover, learning the correction parameter enables effective correction with less memory compared to a case where the command value itself or the correction amount itself is learned.

Second Embodiment

Figure 12:
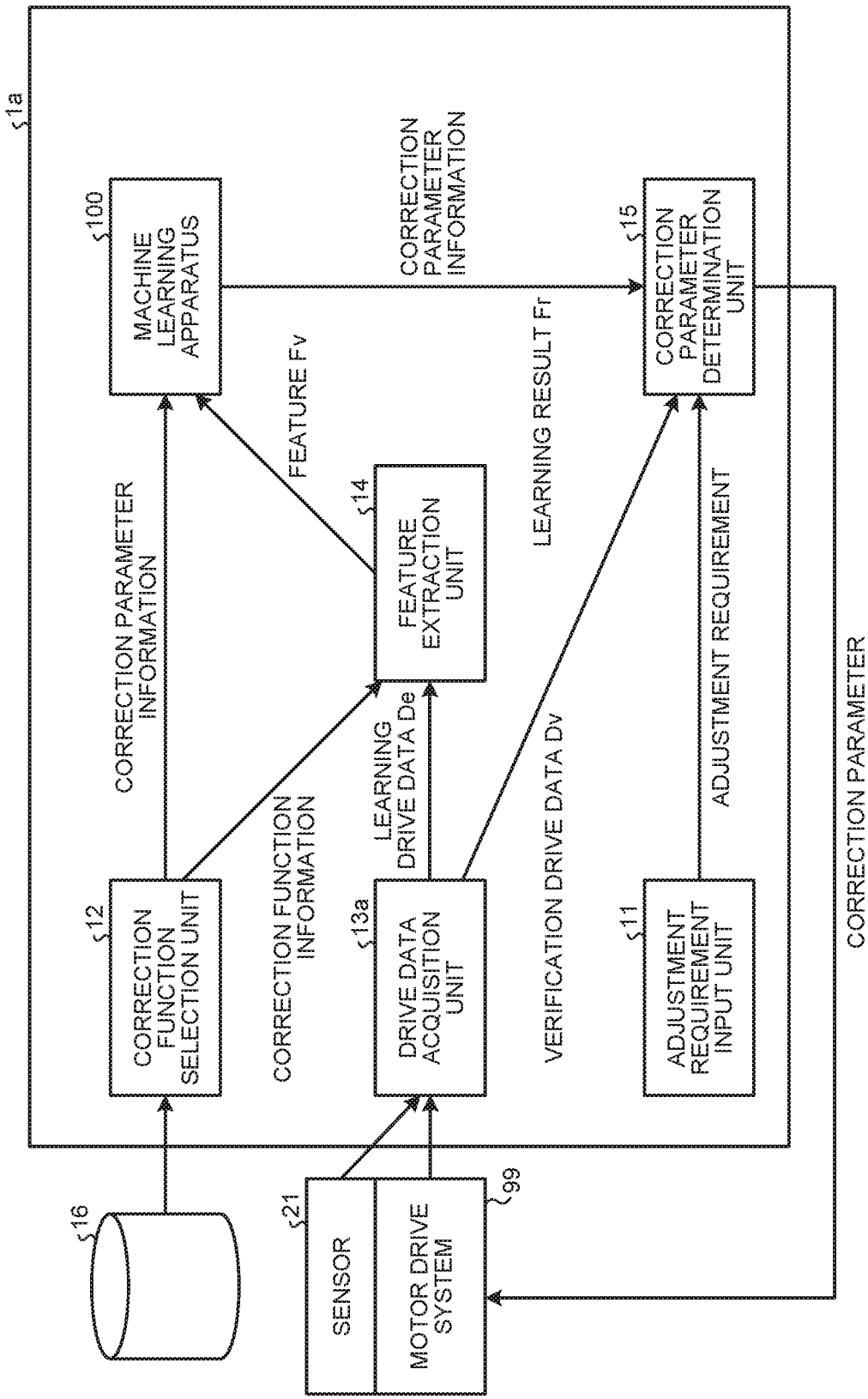
FIG. 12 is a diagram illustrating a configuration of a correction parameter adjustment apparatus according to a second embodiment of the present invention.

FIG. 12 is a diagram illustrating a configuration of a correction parameter adjustment apparatus 1a according to a second embodiment of the present invention. The correction parameter adjustment apparatus 1a includes the adjustment requirement input unit 11, the correction function selection unit 12, a drive data acquisition unit 13a, the feature extraction unit 14, the correction parameter determination unit 15, and the machine learning apparatus 100.

The correction parameter adjustment apparatus 1a according to the second embodiment is similar to the correction parameter adjustment apparatus 1 except for the drive data acquisition unit 13a included instead of the drive data acquisition unit 13 of the correction parameter adjustment apparatus 1 according to the first embodiment, whereby differences from the first embodiment will be mainly described below. A sensor 21 is provided to the motor drive system 99 subjected to adjustment by the correction parameter adjustment apparatus 1a. The drive data acquisition unit 13a acquires a detection signal of the sensor 21 as drive data in addition to drive data that is a control signal of the motor drive system 99.

The sensor 21 is an acceleration sensor, a temperature sensor, a displacement sensor, or the like. One or a plurality of kinds of the sensors 21 may be mounted to the motor drive system 99.

In a case where an acceleration sensor is used as the sensor 21 and mounted to the table 84 of the mechanical device 3, for example, a feature related to vibration of the table 84 of the mechanical device 3 that cannot be acquired by the control signal of the motor drive system 99 can be extracted for use as a state variable. Integrating signals of the acceleration sensor enables estimation of a path of movement of the table 84 so that the path of movement of the table 84 can be extracted as a feature and used as a state variable. Mounting the acceleration sensor to the table 84 enables adjustment of a correction parameter that can enhance the effect of the friction correction function at a tip of a machine, for example. Moreover, extracting the acceleration both during and not during machining enables adjustment of a correction parameter of a correction function that prevents machining disturbance.

Furthermore, when an acceleration sensor, a temperature sensor, and a displacement sensor are used as the sensor 21, a correction parameter for a correction function related to thermal displacement can be adjusted with high accuracy. As described above, the use of the detection signal of the sensor 21 can obtain information that cannot be acquired by only the drive data which is the control signal of the motor drive system 99, and can improve the accuracy of adjustment of the correction parameter.

Third Embodiment

Figure 13:
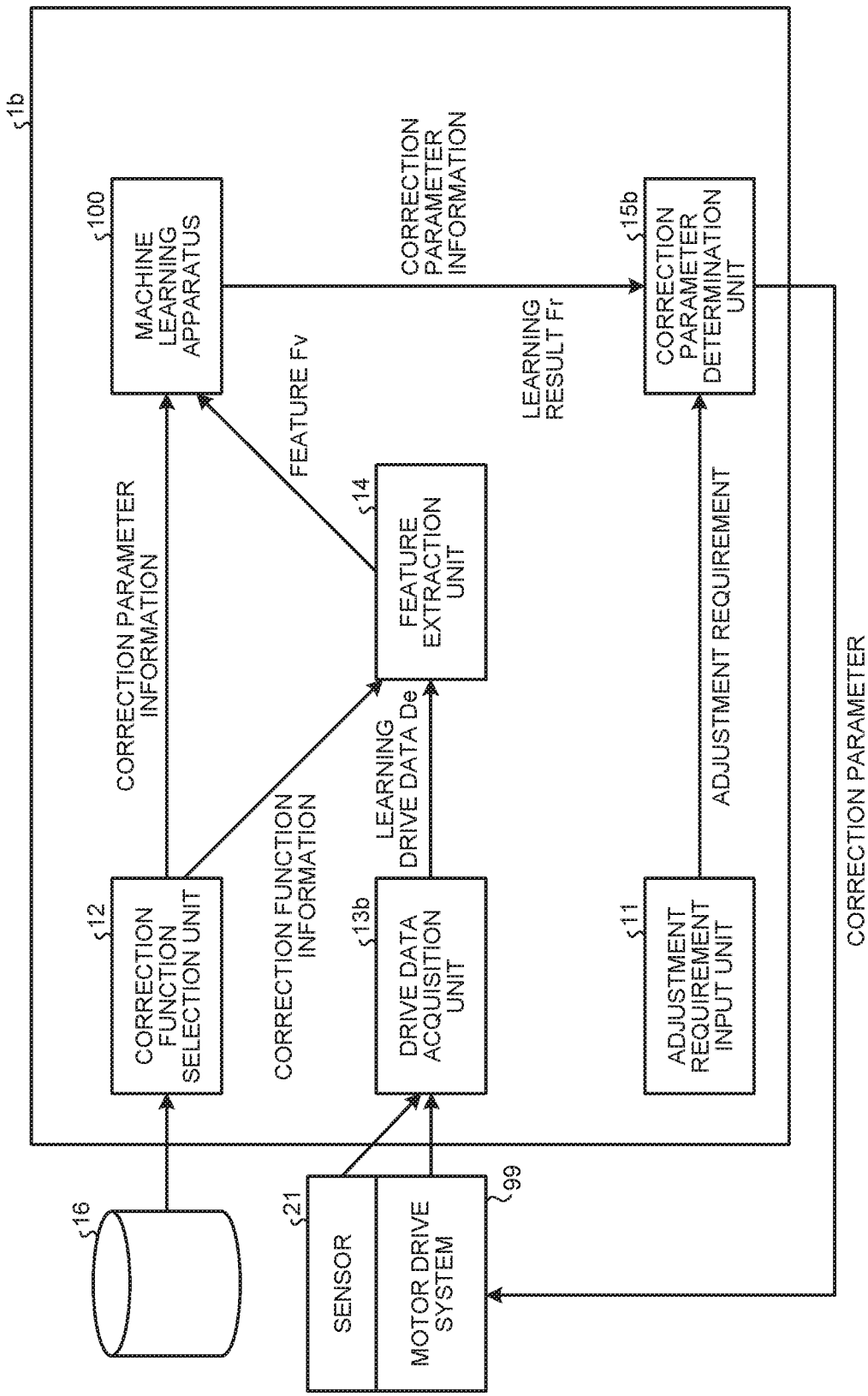
FIG. 13 is a diagram illustrating a configuration of a correction parameter adjustment apparatus according to a third embodiment of the present invention.

FIG. 13 is a diagram illustrating a configuration of a correction parameter adjustment apparatus 1b according to a third embodiment of the present invention. The correction parameter adjustment apparatus 1b includes the adjustment requirement input unit 11, the correction function selection unit 12, a drive data acquisition unit 13b, the feature extraction unit 14, and a correction parameter determination unit 15b.

The correction parameter adjustment apparatus 1b includes the drive data acquisition unit 13b and the correction parameter determination unit 15b instead of the drive data acquisition unit 13a and the correction parameter determination unit 15 of the correction parameter adjustment apparatus 1a, respectively. Differences from the correction parameter adjustment apparatus 1a will be mainly described below.

As with the drive data acquisition unit 13a, the drive data acquisition unit 13b acquires not only a control signal of the motor drive system 99 but a detection signal of the sensor 21 as drive data. Moreover, the drive data acquisition unit 13b inputs the learning drive data De to the feature extraction unit 14 but does not input the verification drive data Dv to the correction parameter determination unit 15b.

The correction parameter determination unit 15b determines a correction parameter on the basis of an adjustment requirement input from the adjustment requirement input unit 11 and a learning result Fr and correction parameter information input from the machine learning apparatus 100, and determines whether or not to end the correction parameter adjustment processing.

Figure 14:
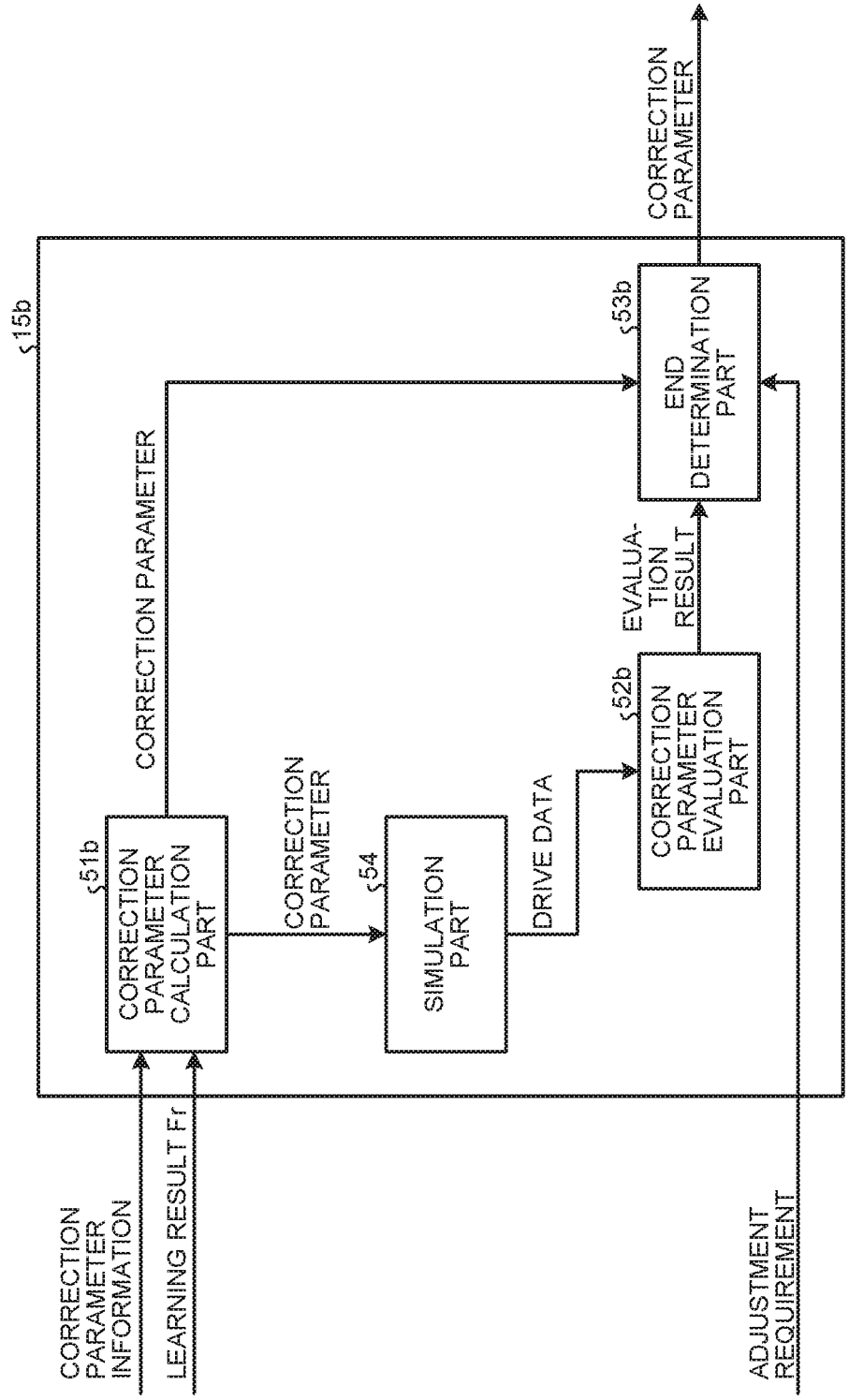
FIG. 14 is a diagram illustrating a configuration of a correction parameter determination unit illustrated in FIG. 13.

FIG. 14 is a diagram illustrating a configuration of the correction parameter determination unit 15b illustrated in FIG. 13. The correction parameter determination unit 15b includes a correction parameter calculation part 51b, a simulation part 54, a correction parameter evaluation part 52b, and an end determination part 53b.

On the basis of the learning result Fr and the correction parameter information input from the machine learning apparatus 100, the correction parameter calculation part 51b calculates a correction parameter approximating the learning result Fr for each correction function. The correction parameter calculation part 51b inputs the calculated correction parameter to the simulation part 54 and the end determination part 53b.

The simulation part 54 runs a drive simulation using the correction parameter input from the correction parameter calculation part 51b. The simulation part 54 inputs a simulation result to the correction parameter evaluation part 52b.

The correction parameter evaluation part 52b evaluates drive data included in the simulation result input from the simulation part 54, and inputs an evaluation result to the end determination part 53b. The end determination part 53b compares the adjustment requirement with the evaluation result and determines whether or not to end the correction parameter adjustment processing.

As described above, in the correction parameter adjustment apparatus 1b according to the third embodiment of the present invention, the correction parameter determination unit 15b includes the simulation part 54 that runs the drive simulation using the correction parameter, whereby the correction parameter adjustment apparatus can verify the correction parameter without actually driving the motor drive system 99. This can reduce the time required for adjusting the correction parameter.

The configuration illustrated in the above embodiments merely illustrates an example of the content of the present invention, and can thus be combined with another known technique or partially omitted and/or modified without departing from the scope of the present invention.

REFERENCE SIGNS LIST

1, 1a, 1b correction parameter adjustment apparatus; 2 motor; 3 mechanical device; 4 motor position sensor; 5 command value generator; 6 servo controller; 7 correction amount calculator; 11 adjustment requirement input unit; 12 correction function selection unit; 13, 13a, 13b drive data acquisition unit; 14 feature extraction unit; 15, 15b correction parameter determination unit; 16 correction function information storage; 21 sensor; 31 differential calculator; 32 position controller; 33 speed controller; 34 current controller; 35 drive data transmitter; 41 arithmetic unit; 42 memory; 43 storage; 44 communication device; 45 input device; 46 display device; 51, 51b correction parameter calculation part; 52, 52b correction parameter evaluation part; 53, 53b end determination part; 54 simulation part; 61 algorithm selection part; 62 algorithm storage part; 63 feature calculation part; 82 ball screw; 84 table; 85 table position sensor; 86a, 86b guide mechanism; 87a ball front bearing; 87b rear bearing; 88 rigid coupling; 89 bed; 99 motor drive system; 100 machine learning apparatus; 101 state observation unit; 102 learning unit; 102a reward calculation part; 102b function update part.

The invention claimed is:

1. A machine learning apparatus for learning a correction parameter used in correction of a command value that controls a motor in a motor drive system including a plurality of kinds of correction functions, the apparatus comprising:
   state observation circuitry configured to observe, as a state variable, each of a feature extracted from drive data of the motor drive system for each of a plurality of correction functions on the basis of the kind of any of the correction functions and the correction parameter; and
   learning circuitry configured to learn the correction parameter for each of the correction functions according to a training data set created on the basis of the state variable.

2. The machine learning apparatus according to claim 1, wherein the drive data includes at least one of feedback data from the motor driving the motor drive system and drive data of a mechanical device to be controlled by the motor.

3. The machine learning apparatus according to claim 1, wherein the feature is a multi-dimensional vector quantity and data indicating a characteristic of the drive data for each of the correction functions.

4. The machine learning apparatus according to claim 1, wherein the learning circuitry includes:
   reward calculation circuitry configured to calculate a reward on the basis of the state variable; and
   function update circuitry configured to update a function for determining the correction parameter on the basis of the reward.

5. The machine learning apparatus according to claim 4, wherein the function update circuitry updates the function for each of the correction functions.

6. A correction parameter adjustment apparatus comprising:
   the machine learning apparatus according to claim 1;
   correction function selection circuitry configured to select one of the plurality of kinds of correction functions;
   drive data acquisition circuitry configured to acquire the drive data;
   feature extraction circuitry configured to extract the feature on the basis of the correction function selected and the drive data acquired;
   adjustment requirement input circuitry configured to input an adjustment requirement of the correction parameter; and
   correction parameter determination circuitry configured to determine the correction parameter satisfying the adjustment requirement on the basis of a learning result of the learning circuitry.

7. The correction parameter adjustment apparatus according to claim 6, wherein the drive data includes at least one of feedback data from the motor driving the motor drive system and drive data of the mechanical device to be controlled by the motor.

8. The correction parameter adjustment apparatus according to claim 7, wherein the drive data of the mechanical device is detected data acquired from a sensor installed in the mechanical device.

9. The correction parameter adjustment apparatus according to claim 6, wherein the correction parameter determination circuitry includes:
   correction parameter calculation circuitry configured to calculate a correction parameter on the basis of the learning result and transmit the correction parameter calculated to the motor drive system;
   correction parameter evaluation circuitry configured to evaluate whether or not a result of drive based on the correction parameter calculated satisfies the adjustment requirement; and
   end determination circuitry configured to determine whether or not to end adjustment of the correction parameter on the basis of an evaluation result of the correction parameter evaluation circuitry.

10. The correction parameter adjustment apparatus according to claim 9, wherein the correction parameter evaluation circuitry performs an evaluation using at least one of drive data acquired when the motor drive system is actually driven and drive data acquired when an action of the motor drive system is simulated.

11. A correction parameter adjustment apparatus, comprising:
   the machine learning apparatus according to claim 1;
   correction function selection circuitry configured to select one of the plurality of kinds of correction functions;
   drive data acquisition circuitry configured to acquire the drive data;
   algorithm selection circuitry configured to select an algorithm used for extracting a feature from the drive data for each of the correction functions selected; and
   feature calculation circuitry configured to use the selected algorithm to extract the feature from the drive data acquired.

12. A correction parameter adjustment apparatus, comprising:
   the machine learning apparatus according to claim 1; and
   correction function selection circuitry configured to select the plurality of kinds of correction functions,
   wherein the correction function selection circuitry selects in turn a predetermined combination of correction functions.

13. The machine learning apparatus according to claim 4, wherein the reward calculation circuitry calculates a reward for each of the correction functions.

14. A correction parameter adjustment method, comprising:
   machine learning, performed by a machine learning apparatus, for learning a correction parameter used in correction of a command value that controls a motor in a motor drive system including a plurality of kinds of correction functions, the machine learning including:
   observing, by state observation circuitry, as a state variable, each of a feature extracted from drive data of the motor drive system for each of a plurality of correction functions on the basis of the kind of any of the correction functions and the correction parameter; and
   leaning, by learning circuitry, the correction parameter for each of the correction functions according to a training data set created on the basis of the state variable;
   selecting, by correction function selection circuitry, one of the plurality of kinds of correction functions;
   acquiring, by drive data acquisition circuitry, the drive data;
   extracting, by feature extraction circuitry, the feature on the basis of the correction function selected and the drive data acquired;
   inputting, by adjustment requirement input circuitry, an adjustment requirement of the correction parameter; and
   determining, by correction parameter determination circuitry, the correction parameter satisfying the adjustment requirement on the basis of a learning result of the learning circuitry.

15. The method according to claim 14, wherein the learning circuitry calculates a reward for each of the correction functions.

16. A correction parameter adjustment method, comprising:
   machine learning, performed by a machine learning apparatus, for learning a correction parameter used in correction of a command value that controls a motor in a motor drive system including a plurality of kinds of correction functions, the machine learning including:
   observing, by state observation circuitry, as a state variable, each of a feature extracted from drive data of the motor drive system for each of a plurality of correction functions on the basis of the kind of any of the correction functions and the correction parameter; and
   leaning, by learning circuitry, the correction parameter for each of the correction functions according to a training data set created on the basis of the state variable;
   selecting, by correction function selection circuitry, one of the plurality of kinds of correction functions;
   acquiring, by drive data acquisition circuitry, the drive data;
   selecting, by algorithm selection circuitry, an algorithm used for extracting a feature from the drive data for each of the correction functions selected; and
   using, by feature calculation circuitry, the selected algorithm to extract the feature from the drive data acquired.

17. A correction parameter adjustment method, comprising:
   machine learning, performed by a machine learning apparatus, for learning a correction parameter used in correction of a command value that controls a motor in a motor drive system including a plurality of kinds of correction functions, the machine learning including:
   observing, by state observation circuitry, as a state variable, each of a feature extracted from drive data of the motor drive system for each of a plurality of correction functions on the basis of the kind of any of the correction functions and the correction parameter; and
   learning, by learning circuitry, the correction parameter for each of the correction functions according to a training data set created on the basis of the state variable; and
   selecting, by correction function selection circuitry, the plurality of kinds of correction functions,
   wherein the correction function selection circuitry selects in turn a predetermined combination of correction functions.

* * * * *